United States Patent [19]

Kuciera

[11] Patent Number: 4,488,148

[45] Date of Patent: Dec. 11, 1984

[54] COMBINATION SWITCHING AND DISPLAY ELECTRONIC MODULAR CONTROL UNIT

[75] Inventor: Joachim Kuciera, Arcadia, Calif.

[73] Assignee: Becton, Dickinson and Company, Paramus, N.J.

[21] Appl. No.: 349,960

[22] Filed: Feb. 19, 1982

[51] Int. Cl.³ .............................................. G09G 3/00
[52] U.S. Cl. .................................... 340/700; 340/711; 340/825.56; 364/149; 377/112
[58] Field of Search ............ 340/700, 712, 711, 825.56, 340/825.22, 806, 815.04, 815.14; 377/112, 113, 16; 358/192.1, 194.1, 191.1; 364/146

[56] References Cited

U.S. PATENT DOCUMENTS

| | | | |
|---|---|---|---|
| 3,594,761 | 7/1971 | Boesen et al. | 340/700 |
| 4,193,120 | 3/1980 | Yello | 364/146 |
| 4,274,145 | 6/1981 | Hendricks et al. | 364/146 |
| 4,375,651 | 3/1983 | Templin et al. | 358/194.1 |

OTHER PUBLICATIONS

"A Low Cost, High Performance Digital TV Tuning System", *IEEE Transactions On Consumer Electronics*, Feb. 1977, Dreiske.

*Primary Examiner*—Gerald L. Brigance
*Attorney, Agent, or Firm*—R. P. Grindle

[57] ABSTRACT

This invention relates to a modular electronic unit which provides a combined switching and display function for controlling equipment of all kinds. The unit may be used alone to control equipment as desired, or several such units may be combined to control several pieces of equipment with a single master unit, including a microcontroller which controls the master unit, plus several slave units. The unit of the invention uses a microcontroller in combination with a non-volatile random access memory to provide fully programmable switching codes and display messages. The unit of the invention may be included in new equipment or as a retrofit for existing equipment.

9 Claims, 3 Drawing Figures

COMBINATION SWITCHING AND DISPLAY ELECTRONIC MODULAR CONTROL UNIT

BACKGROUND AND STATEMENT OF THE INVENTION

Generally speaking, this invention relates to an electronic switching control unit, which incorporates a display system, for running equipment. More particularly, this invention relates to a modular electronic switching/display system which is arranged to replace conventional electro-mechanical thumbwheel switches for controlling equipment. The modular electronic unit of the invention may be utilized in new equipment or as a retrofit for older equipment, in substituting for conventional thumbwheel switching devices.

The invention incorporates a microcontroller in combination with a random access memory in the form of a non-volatile random access memory (NOVRAM). Accordingly, the unit of the invention is fully programmable for providing switching codes and display messages. The unit of the invention may be combined with several other units which are connected as slave units with the master unit incorporating the microcontroller which controls all of the units in the series. The arrangement is such that great flexibility is provided in matching the electronic message unit of the invention to a user's particular application.

More specifically, the modular design of the invention allows for a single master unit which will control up to seven slave electronic message units. A four or five character matrix display may be utilized, in accordance herewith, with a light emitting diode display, a liquid crystal display, or a vacuum fluorescent display, as desired. Preferably, a liquid crystal display is utilized because of the low power requirements for such a display. With the arrangement here, the display is not limited to the small number of positions up to perhaps 12 utilized in a rotary wheel of the conventional thumbwheel switches of the past. With the invention here, up to 256 codes/messages are available. A 64-character automatic switch code vocabulary is available on each unit with an additional 50-character code available if a liquid crystal display unit is provided.

Each electronic message unit module has a two-button control, with each button for a particular direction in the sequence of characters available for display with the switches providing a higher or lower change in display by one position, depending upon which switch is actuated, or the arrangement is such that an automatic cycle may be provided with each movement or actuation of the switches through a variety of codes or messages, as required. As will be appreciated, with the utilization of the non-volatile random access memory in the units, in accordance herewith, the last code or message entered prior to power down is maintained when the unit is reactivated.

One object of this invention is, therefore, to provide a modular electronic switching and display system to replace a conventional electro-mechanical thumbwheel switching device for controlling equipment of all kinds.

A further object of the invention is to provide such an electronic message unit which allows much greater flexibility in matching the unit to specific applications without the need for a customer development of specific switches for specific applications. A further object of the invention is to provide an electronic message unit control arrangement wherein the size of the arrangement may be increased or decreased as required by the use of additional slave units controlled by the original single master unit for controlling several pieces of related equipment, as required.

Other objects and advantages of this invention will be apparent from the following description, the accompanying drawings, and the appended claims.

DETAILED DESCRIPTION OF THE INVENTION

Figure 1:
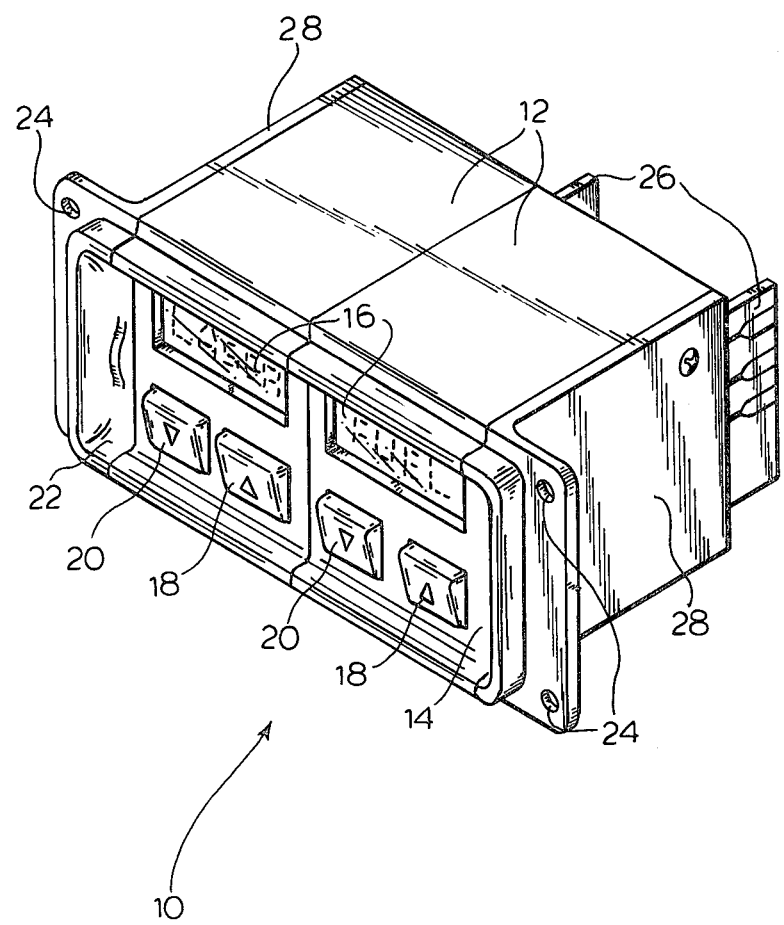
FIG. 1 is a perspective view of an electronic message unit module illustrating the invention.

Referring to the drawings in which like reference characters refer to like parts throughout the several views thereof, FIG. 1 shows a view in perspective of an electronic message unit module of the invention generally indicated at 10, with the unit 10 having a switch case body 12 with a front display face 14 with a display panel 16 thereon. Also on front face 14 are upcount switches 18, and downcount switches 20. Fixed on switch case 12, at each end thereof is a mounting bracket 28 with spaced mounting holes 24 for mounting the case body 12 in place on a control panel as required for controlling a piece of equipment. Extending from the rear of switch case 12 is a printed circuit board 26 for connecting the unit 10 to the rest of the system for controlling a piece of equipment as will be understood by practitioners-in-the-art.

Figure 2:
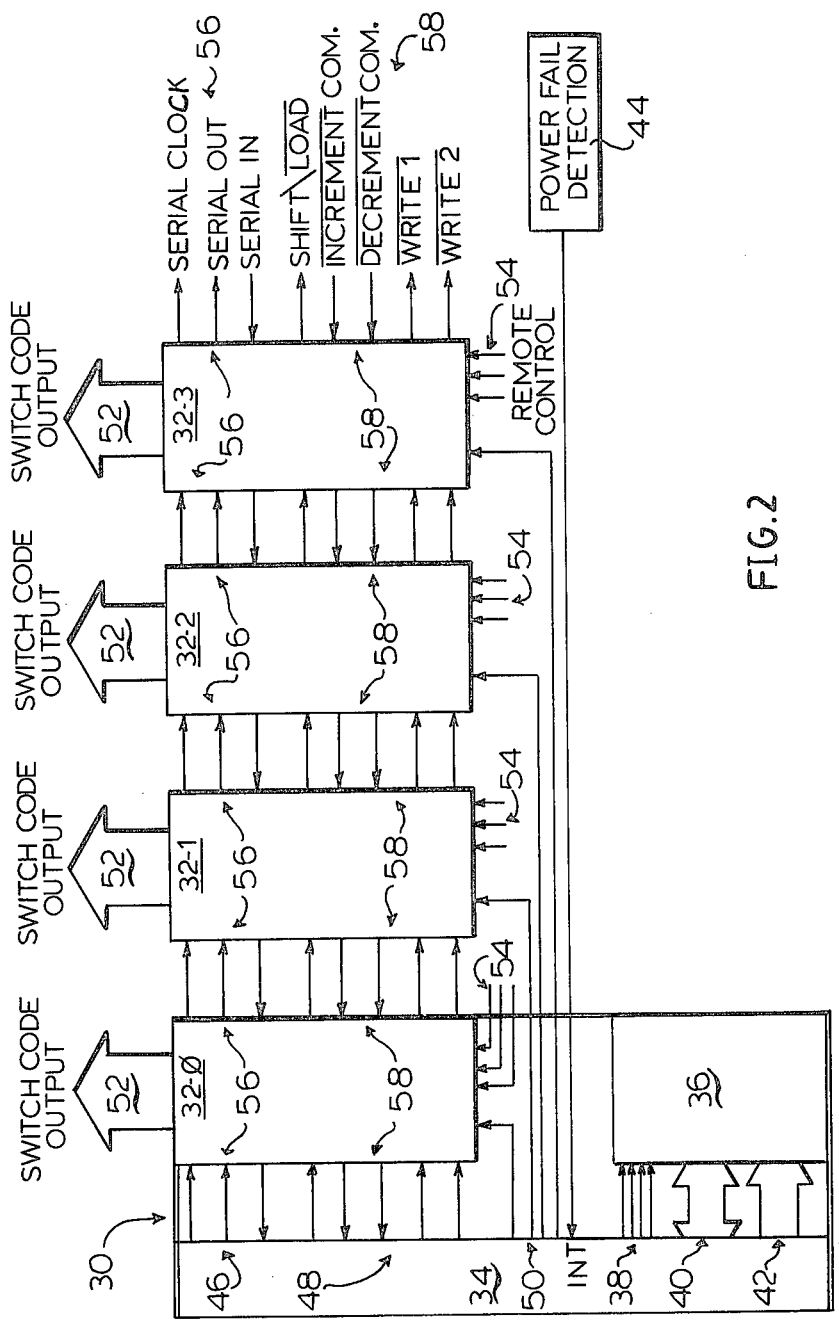
FIG. 2 is a diagrammatic arrangement of a system block diagram illustrating the invention.

Referring now to FIG. 2, a system block diagram is shown, having a master electronic message unit module 30, and four slave electronic message unit modules 32. It will be appreciated that additional slave units 32, up to a total of 7, may be connected into the system, as required, depending upon the amount of equipment being controlled. As can be seen in FIG. 2, the master electronic message unit 30 has incorporated therein a microcontroller device 34. The Master module 30 has three busses 38, 40 and 42 which form the interconnect between a NOVRAM 36, and the microcontroller 34.

These busses include the NOVRAM control buss 38, which is a four-line control buss which provides the read/write commands to the NOVRAM, as well as STORE and RECALL commands during power down and power up respectively.

The second buss in Master module 30 is the NOVRAM data buss 40, a four-line bi-directional data buss which contains the data being written to or read from the NOVRAM 36.

The third buss in Master module 30 is the NOVRAM address buss 42, a six-line output buss from the microcontroller 34 to the NOVRAM 36. This buss selects one of the sixty-four locations in the 64×4 bit NOVRAM.

As can be seen further in FIG. 2, the master module 30 also includes an advanced power failure detection circuit 44, which initiates the NOVRAM store cycle.

The microcontroller has two busses which form the interconnect between all electronic message unit modules of a specific system. These include the Serial Interface Buss 46/56 which is a three-line serial communications buss comprised of Serial Clock, Serial Data out to the modules, and Serial Data in to the microcontroller from the modules. Information on these lines will be switch codes, programmable read only memory (PROM) Addresses and Display Commands and Data for a selected module on the Serial Data Out line. Serial Data In will be PROM data from a selected module.

The second buss is the MODULE CONTROL BUSS 48/58. This buss consists of seven lines which allow the microcontroller to control the various functional elements within each slave module. Among these signals are the switch commands from the selected module to the microcontroller.

Each buss connection 46, 48 for microcontroller 34 includes a main line connection 56, 58, respectively, for making the various connections, as discussed above.

Eight Device Select lines 50, provide individual module enable commands to the Master module 30, and up to 7 slave modules 32. Each of the modules 32 shown in FIG. 2 includes a switch code output buss 52, and a Remote Control Command Buss 54 to be described later.

Figure 3:
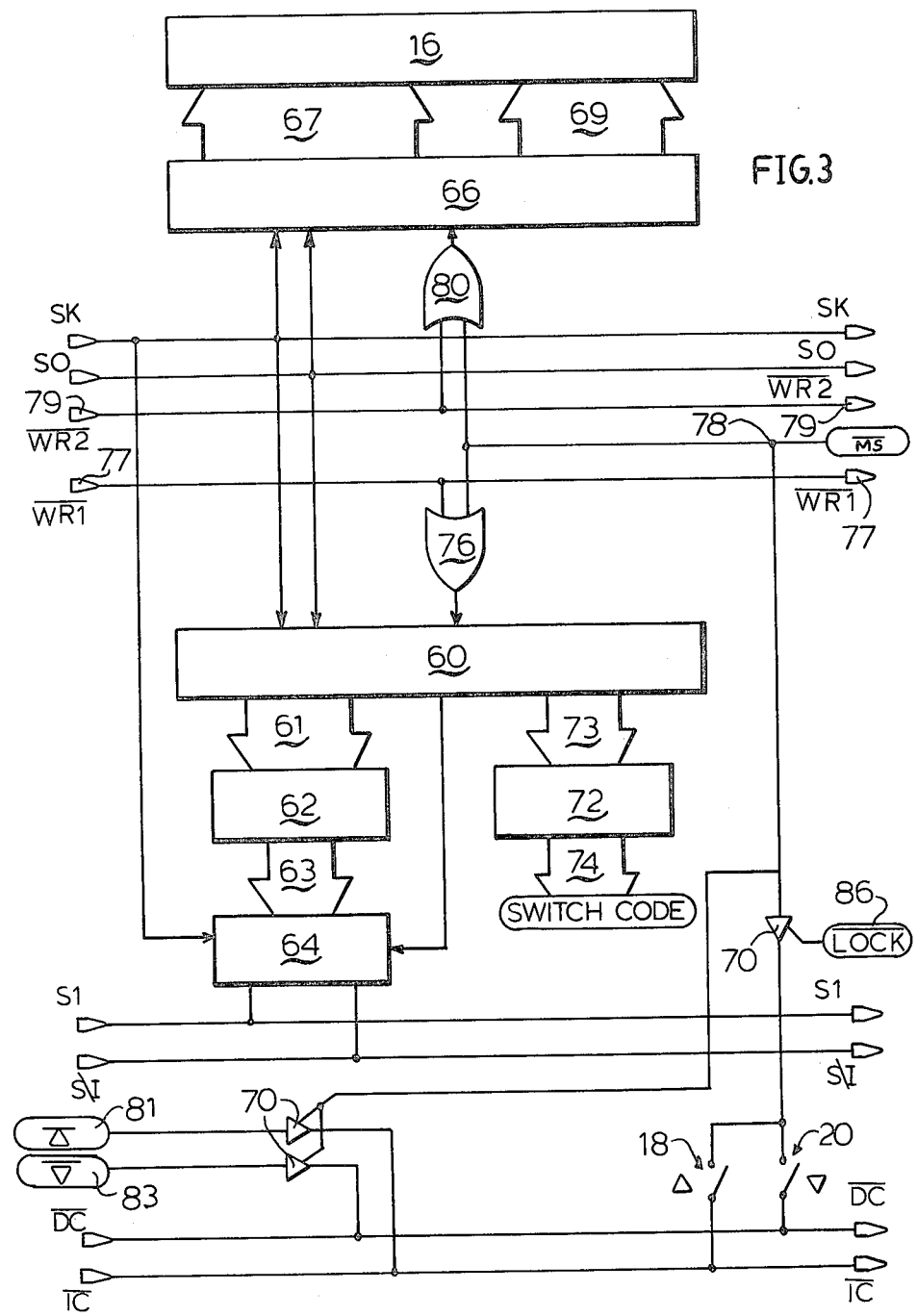
FIG. 3 is a diagramatic arrangement of the control circuit for a single electronic message unit illustrating the invention for use with a liquid crystal, light emitting diode, or vacuum fluorescent display.

Referring now to FIG. 3, the system of each electronic message unit can be broken down as shown. Each message unit module 32 consists of the five functional elements including a serial Read Only Memory (ROM) switchcode address register 60, a PROM/EPRON (electronically programmable read only memory) device 62, a serial ROM (read only memory) buss register 64, a display controller 66 and associated display 16, and remote control logic 70.

Except for the PROM/EPRON 62 and the remote control logic 70, all other elements in each electronic message unit 32 uses the serial interface buss 56 as its primary means of receiving commands and data from the microcontroller 34.

The PROM/EPRON 62 communicates with the microcontroller 34 indirectly through the serial ROM switchcode address register 60, which provides addressing information to the ROM via the address lines 61, and transmits data over the 8 data lines 63 to the serial ROM buss register 64.

The serial ROM/switchcode address register 60 also provides the parallel switchcode outputs used to control external equipment. These 8 parallel outputs 73 go directly to the switchcode output buss 74 of the individual electronic message unit module. As shown, if a lead switching capability is required, a buffer/driver array 72 may be inserted into the switchcode output path 74.

Communications from the microcontroller 34 to the serial ROM/switchcode address register 60 is controlled by the ROM/switchcode gate 76 which enables serial ROM/switchcode address register 60 when both the WRITE 1 COMMAND 77 and the module select command 78 are at a logic $\emptyset$.

Communications from the microcontroller 34 to the display controller 66 is controlled by the display gate 80, which provides an enable command when WRITE 2 command 79 and module select command 78 are both logic $\emptyset$.

The display controller 66 may be an LSI (Large Scale Integration) device which performs all tasks required to drive a display 16 via multiplexed column drive 67 and row drive 69 outputs.

Increment 18 and decrement 20 switches in each module provide local commands to the microcontroller 34 for incrementing or decrementing through the module switchcode display message file. The commands of these switches are enabled when module select 78 is logic $\emptyset$.

Remote Control Logic Gates 70, provide for optional remote increment 81, or remote decrement 83 command capability, or for remote lockout 86, which will inhibit command entry via the front panel switches 18, 20.

Thus, as will be appreciated from the foregoing, there is provided in accordance with this invention, a modular electronic message unit arrangement for controlling equipment which is extremely flexible and capable of being adjusted to a large variety of different programs, depending upon the control required for a specific application. Moreover, the arrangement of the invention is such that a plurality of electronic message units may be connected together with a master unit controlling all of the units for connection to a plurality of different pieces of equipment. The arrangements of the invention here may be utilized to replace conventional electromechanical thumbwheel switching devices, for example, or they may be connected for use with new equipment. Because of the versatile programming ability of the devices, in accordance herewith, they are particularly appropriate for retrofit applications.

While the forms of apparatus herein described constitute preferred embodiments of the invention, it is to be understood that the invention is not limited to these precise forms of apparatus, and changes may be made therein without departing from the scope of the invention which is defined in the appended claims.

What is claimed is:

1. A self-contained modular electronic switching unit for use in place of an electromechanical digital switch for controlling equipment comprising:
   (a) a casing module;
   (b) a display on said module for displaying switch position information to the user;
   (c) a microcontroller in said module for coordinating the electrical components of said switching unit in performing the switching function;
   (d) a non-volatile random access memory in said module for storing ongoing switching information regarding the switch position and retaining said information in the event of an electrical power failure so that upon power resumption said information being available for use;
   (e) a programmable read-only memory in said module for receiving and storing information regarding the electrical code output for each switch position and the corresponding message for transmission to said display;
   (f) a read-only memory serial switch code register in said module for storing information regarding specific locations of information in said programmable read-only memory and directing electrical signals to the specific locations and for providing parallel switch code output signals to control external equipment;
   (g) buss means on said module for the electrical connection thereof to equipment to be controlled;
   (h) first means for providing flow communication between said microcontroller and said non-volatile random access memory;
   (i) said first flow communication means including
      (1) a non-volatile random access memory data buss for allowing the transfer of data between said microcontroller and said non-volatile random access memory, (2) a non-volatile random access memory address buss, (3) a non-volatile random access memory control buss, and (4) a serial interface buss for allowing serial input of data into said non-volatile random access memory (j) second means including address lines for providing flow communication of address information between said programmable read-only memory and said serial switch code register so that address information can be changed or intialized;

(k) third means including data lines for providing flow communication of data between said programmable read-only memory and said serial switch code register so that switch code data can be changed or initialized; and (l) an output electrically connected to said serial switchcode register for communicating with the equipment being controlled.

2. The apparatus of claim 1, further including an output buffer driver electrically connected between said output and said serial switch code register.

3. The apparatus of claim 1, wherein said display includes a liquid crystal display.

4. The apparatus of claim 1 wherein said display includes a light emitting diode display.

5. The modular electronic switching unit of claim 1 further including a module control buss for allowing said switching unit to communicate with other switching units.

6. A self-contained electronic switch control system for controlling a plurality of pieces of equipment characterized by (a) a master modular electronic switching unit comprising:

(1) a casing;

(2) a display for displaying switch position information to the user on said casing;

(3) a microcontroller for coordinating the electrical components of said switching unit in performing the switching function in said casing;

(4) a non-volatile random access memory in said casing for storing ongoing switching information regarding the switch position and retaining said information in the event of an electrical power failure so that upon power resumption said information being available for use;

(5) a programmable read-only memory in said casing for receiving and storing information regarding the electrical code output for each switch position and the corresponding message for transmission to said display;

(6) a read-only memory serial switchcode register in said casing for storing information regarding specific location of information in said programmable read-only memory and directing electrical signals to the specific locations and for providing parallel switch code output signals to control other switching units;

(7) first means for providing flow communication between said microcontroller and said non-volatile random access memory;

(8) said first flow communication means including (i) a non-volatile random access memory data buss for allowing the transfer of data between said microcontroller and said non-volatile random access memory;

(ii) a non-volatile random access memory address buss;

(iii) a non-volatile random access memory control buss; and (iv) a serial interface buss for allowing serial input of data into said non-volatile random access memory;

(9) second means including address lines for providing flow communication of address information between said programmable read-only memory and said serial switchcode register so that address information can be changed or initialized; and

(10) third means including data lines for providing flow communication of data between said programmable read-only memory and said serial switch code register so that switch code data can be changed or initialized (b) at least one slave modular electronic switching unit in electrical communication with said master switching unit, each said slave switching unit comprising:

(1) a slave casing;

(2) a slave display on said slave casing for displaying slave switch position information to the user;

(3) a slave programmable read-only memory in said slave casing for receiving and storing information regarding the electrical code output for each slave switch position and the corresponding message for transmission to said slave display;

(4) a slave read-only memory serial switchcode register in said slave casing for storing information regarding specific locations of information in said slave programmable read-only memory and directing electrical signals to the specific location and for providing parallel switch code output signals to control external equipment;

(5) slave buss means on said slave casing for the electrical connection thereof to equipment to be controlled by said system; and (6) a slave output electrically connected to said slave switch code register for communicating with the equipment being controlled (c) buss means on said casing for the electrical connection of said master modular electronic switching unit and said slave modular electronic switching unit; and (d) an output electrically connected to said serial switchcode register for communicating with said slave modular switching control unit.

7. The apparatus of claim 6 further including an output buffer drive in each said slave output.

8. The apparatus of claim 6, wherein said display includes a liquid crystal display and said slave display includes a liquid crystal display.

9. The apparatus of claim 6, wherein said display includes a light emitting diode display and said slave display includes a light emitting diode display.

* * * * *